T. E. BARNUM.
MOTOR CONTROLLER.
APPLICATION FILED APR. 3, 1916.

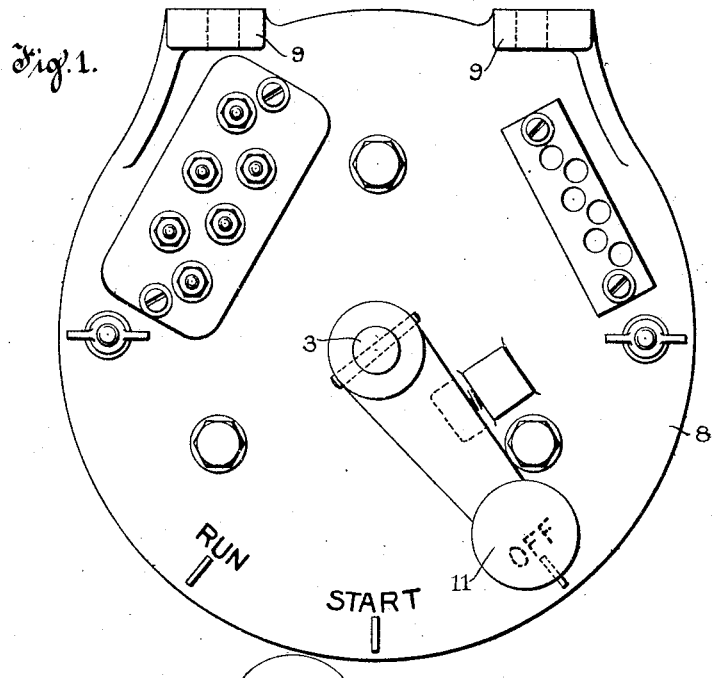
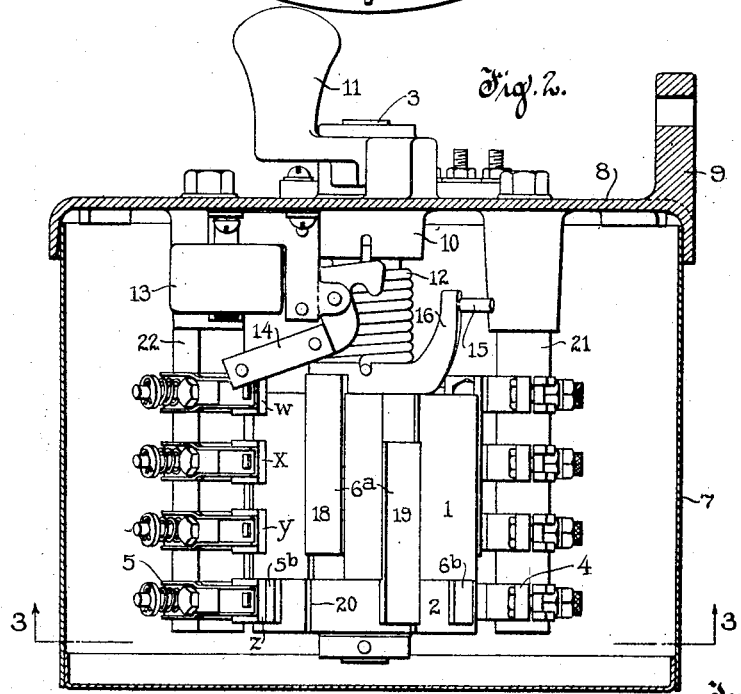

1,322,995.

Patented Nov. 25, 1919.
2 SHEETS—SHEET 2.

Inventor
Thomas E. Barnum
By Francis A. Hubbard
Attorney

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,322,995.  Specification of Letters Patent.  Patented Nov. 25, 1919.

Application filed April 3, 1916. Serial No. 88,637.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to motor controllers and more particularly to controllers for alternating current motors, although certain features of the invention may be advantageously used in other relations.

For starting alternating current motors by progressive establishment of star and delta connections therefor, the latter connections including fuses, it has heretofore been customary to employ controllers movable in one direction from a given position for star connections and in a reverse direction for delta connections in order to enable return from the final position to neutral position without reëstablishment of star connections, and such a movement is open to certain obvious objections.

This invention has among its objects to provide a simplified controller for the aforesaid and other purposes which may be operated uni-directionally to progressively establish starting and running connections and returned to initial position without reëstablishment of starting connections.

Other objects and advantages of the invention will hereinafter appear.

The accompanying drawing illustrates one embodiment of the invention and the same will now be described, it being understood that the invention may be embodied in other forms falling within the scope of the appended claims.

In the accompanying drawing,

Figure 1 is a top plan view of the controller;

Fig. 2 is a side elevation of the controller with the casing shown in section to expose the controller parts;

Figure 3:
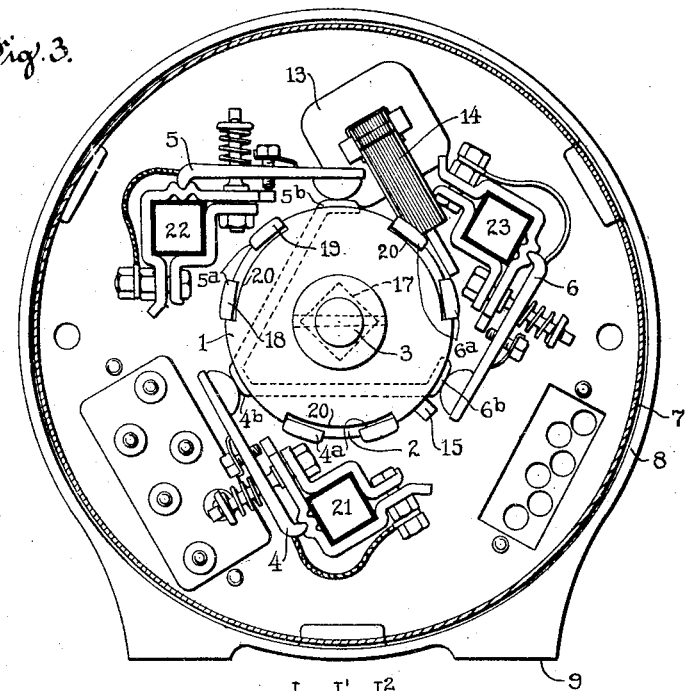
Fig. 3 is a sectional view taken on line 3—3, Fig. 2.

Referring to Figs. 1 to 3 inclusive, the controller includes two drum sections 1 and 2 mounted upon a shaft 3 to coöperate with three sets of stationary contact fingers 4, 5 and 6 (Fig. 3). The drum sections and coöperating contact fingers are inclosed in a casing 7 and are suspended from the top 8 of said casing which has supporting lugs 9 for attachment to a suitable base. The shaft 3 is mounted in a bearing 10 provided on the supporting member 8 and extends through said member for operation by a suitable handle 11. In the neutral or off position of the controller the handle 11 stands in the position shown in Fig. 1 and the controller is movable to starting and running positions progressively by movement of the handle to the left. A spring 12 surrounding the shaft 3 biases the controller to off position while an electromagnet 13 having a hooked armature 14 to engage a pin 15 on an arm 16 fixed to the shaft 3, serves to hold the controller in running position.

The drum section 1 of the controller is fixed to the shaft 3, the same being mounted upon a section 17 of said shaft which is rectangular in cross section, as shown in Fig. 3. It carries three sets of contact plates 4ª, 5ª and 6ª to coöperate with contact fingers 4, 5 and 6 respectively and each of these sets includes two contact plates 18 and 19. As best shown in Fig. 2 the contact plates 18 and 19 are arranged in a parallel relation and are staggered so that plates 19 overlap drum section 2. Drum section 2 is mounted upon a cylindrical section of the shaft 3 and is freely oscillatable upon said shaft. It is, however, limited in its oscillating play by the extended or over-lapping contact plates 19 of drum section 1. More specifically the contact plates 19, as best illustrated in Figs. 2 and 3, project into peripheral notches 20 in the drum section 2 and thereby limit the play of said drum section to the length of said notches. Thus in effect a lost motion connection is provided between the two drum sections which serves the purpose hereinafter described. The drum section 2 carries but three contact plates 4ᵇ, 5ᵇ and 6ᵇ to coöperate with contact fingers 4, 5 and 6 and, as illustrated in dotted lines, Fig. 3, the three contact plates comprise a single continuous plate bent into V-shape.

The three sets of contact fingers 4, 5 and 6 are, as best illustrated in Fig. 3, mounted upon rectangular posts 21, 22 and 23 depending from the top 8 of the casing. The contact fingers and mountings therefor are of a well known type and hence do not require description. The three sets are identical and each comprise four fingers w, x, y, and z, Fig. 2.

Figure 4:
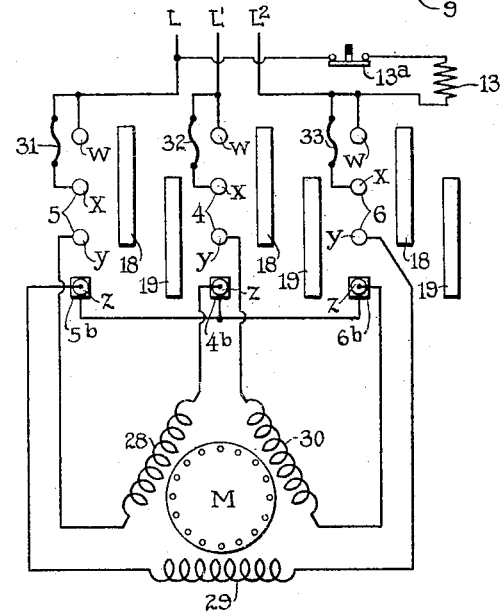
Fig. 4 is a diagrammatic view showing the controller connected to an alternating current motor for star-delta connections.

The operation and purpose of the structure described will be better understood after consideration of the connections to be established thereby, and accordingly Fig. 4 will now be described. This figure schematically illustrates a three phase squirrel cage motor M having primary windings 28, 29 and 30 and also shows schematically all of the above described contacts of the controller, fuses 31, 32 and 33 to be included in the running connections, holding magnet 13 and a control switch 13$^a$ for said magnet.

The contact fingers z of the three sets 4, 5 and 6 are respectively connected to the windings 28, 29 and 30 and hence when said fingers are engaged by the connected drum contacts 4$^b$, 5$^b$ and 6$^b$ respectively, they serve to unite said windings for star connection. The opposite terminals of the windings 28, 29 and 30 are respectively connected to the contact fingers y of the series 5, 6, and 4 and are adapted to be connected directly to lines L, L$^2$, L' by the bridging of contact fingers y and w by the contact plates 18 of drum section 2. Thus it will be observed that the contact plates 18 of drum section 1 and the contacts of drum section 2 coöperate to establish starting connections, that is, with the motor windings star connected.

On the other hand, drum contact plates 19 alone serve to establish the running connections, namely the delta connections. These plates serve to bridge contact fingers x, y and z of their respective sets of fingers and in so doing include in circuit the fuses 31, 32 and 33. Under such conditions, it will be apparent that winding 28 will be connected across lines L, L' while winding 29 will be connected across lines L and L$^2$ and winding 30 across lines L' and L$^2$ which, as stated, establishes delta connection of said windings for running.

Returning now to the structure illustrated, it will be observed from Fig. 2, which shows the controller in off position, that the contacts of drum section 2 engage their respective contact fingers z while the overlapping contact plates 19 of drum section 1 stand at the extreme right of the peripheral recesses in drum section 2. Accordingly upon initial movement of the controller handle to the left the drum section 1 will rotate independently of drum section 2 to engage contact plates 18 with the several sets of contact fingers thereby establishing the starting connections above described. In this connection it is to be noted that the friction between the contacts of drum section 2 and their respective fingers may be relied upon to insure against accidental movement of said drum section. However, operation of the drum section 1 as described will bring the contact plates 19 into abutting relation with the left hand end walls of the peripheral notches in drum section 2. Hence as the movement of the drum section is continued, drum section 2 will move therewith whereby the contact plates 18 on section 1 and the contacts on section 2 will disengage the several sets of contact fingers and this will be followed by engagement of plates 19 with said sets of fingers to establish the running connections above described. In this position of the controller the magnet 13, which is shown in Fig. 4, as connected across lines L and L$^3$ through control switch 13$^a$ will act to lock said controller against return movement.

Assume now that the controller be released from running. Under such conditions it will be apparent that no movement will be imparted to the drum section 2 until the overlapping plates 19 travel the length of the notches 20, or in other words, abut the right hand end walls of said notches. In consequence, drum section 2 will not move until the two sections are in the relation shown in Fig. 2 with the obvious result that the contact plates 19 and 18 of the drum section 1 will disengage the several sets of contact fingers before the contacts of drum section 2 reëngage their respective fingers. It therefore follows that during the return movement of the controller the motor will be disconnected from circuit immediately upon disengagement of drum contact plates 19 from the sets of contact fingers and that the reëngagement of drum contact plates 18 with the contact fingers will have no effect because they will leave said fingers before the reëngagement of the contacts on drum section 2. On the other hand, when the controller is returned to full off position the contacts of drum section 2 will be reëngaged with their respective contact fingers, thus preparing the controller for restarting in the manner above described.

In a word, the controller provided is operable in the same manner as an ordinary direct current motor controller, at the same time effecting the same steps of control as the reverse operating controllers heretofore used and with absolute safety without necessitating any special guiding means.

What I claim as new and desire to secure by Letters Patent is:

1. In combination, stationary contacts, movable contacts coöperable therewith for selectively establishing starting and running connections, a common operating member for said movable contacts and operative connections whereby the latter contacts may be moved from a given neutral relation with the former contacts to starting relation and then to running relation therewith by unidirectional operation of said member and whereby said member may be operated to return said movable contacts from either starting relation or running relation directly to said neutral relation.

2. In a motor controller, in combination, stationary contacts, movable contacts coöperable therewith for selectively establishing starting and running connections, a common operating member for said movable contacts and operative connections whereby the latter contacts may be moved from a given neutral relation with the former contacts to starting relation and then to running relation therewith by unidirectional movement of said member and whereby the relation of certain of said movable contacts to other of the same may be changed for restoration of said contacts to said neutral relation without reëstablishment of starting connections.

3. In a motor controller, in combination, stationary contacts, movable contacts coöperable therewith for selectively establishing starting and running connections, a common operating member for said movable contacts and operative connections providing for movement of the latter contacts into starting relation with the former contacts and then into running relation therewith by unidirectional movement of said member and further providing for a change in the relation of certain of said movable contacts by reverse movement of said member, whereby said contacts may be restored to neutral relation without reëstablishment of starting connections.

4. In a motor controller, in combination, stationary contacts, movable contacts coöperating therewith for selectively establishing starting and running connections, a common operating member for said movable contacts and operative connections whereby starting and running connections may be established by unidirectional operation of said member and interrupted by reverse operation of said member and whereby certain of said movable contacts are movable relatively to other of the same to insure against reëstablishment of starting connections by such reverse movement of said member.

5. In a motor controller, in combination, stationary contacts, movable contacts coöperable therewith for selectively establishing starting and running connections, a common operating member for said movable contacts and operative connections providing for movement of said movable contacts into starting relation and then into running relation with said stationary contacts by unidirectional movement of said member and further providing for a play between certain of said movable contacts whereby the latter may be returned to a neutral relation with respect to said stationary contacts without reëstablishment of starting connections, means tending to restore said contacts to neutral relation and means for releasably holding said contacts in running relation.

6. In a motor controller, in combination, stationary contacts, movable contacts coöperating therewith for selectively establishing starting and running connections, a common operating member for said movable contacts, operative connections whereby starting and running connections may be established by uni-directional operation of said member and interrupted by reverse operation of said member and whereby certain of said movable contacts are movable relatively to other of the same to insure against establishment of starting connections by such reverse movement of said member, means biasing said member for such reverse movement thereof and means to releasably hold said contacts in running relation.

7. In a motor controller, in combination, stationary contacts, and contact devices coöperating therewith to selectively establish starting and running connections, said devices being movable together uni-directionally to establish starting and running connections progressively and having a limited relative movement to render the same functionally inactive during their return movement to initial position.

8. In a motor controller, in combination, stationary contacts, and contact devices coöperating therewith to selectively establish starting and running connections, said devices being movable together uni-directionally to establish starting and running connections progressively and being interlocked by certain of the contact parts thereof to permit a relative movement of one with respect to the other during the return movement of said devices to render the same functionally inactive during such return movement.

9. In a motor controller, in combination, stationary contacts, contact devices coöperating therewith to selectively establish starting and running connections, said devices having a lost motion connection therebetween and being operable uni-directionally to establish starting and running connections progressively, means biasing said devices to initial position and said lost motion connection between said devices insuring biased operation thereof in a functionally inactive relation and means for releasably securing said devices in position for maintaining running connections.

10. In a controller for alternating current motors, in combination, coöperating stationary and movable contacts for selectively establishing star and delta connections for the motor, an operating member for said movable contacts, operative connections whereby said member is operable uni-directionally from a given position to effect establishment of star and delta connections progressively, and whereby said movable contacts are returnable to initial position without reëstablishment of star connections, means for automatically effecting such return movement of said movable contacts and means to releasably hold said movable contacts in position to maintain delta connections.

In witness whereof, I have hereunto subscribed my name.

THOMAS E. BARNUM.